July 8, 1941.  J. BECKER  2,248,054
SCREW DRIVER
Filed June 7, 1939
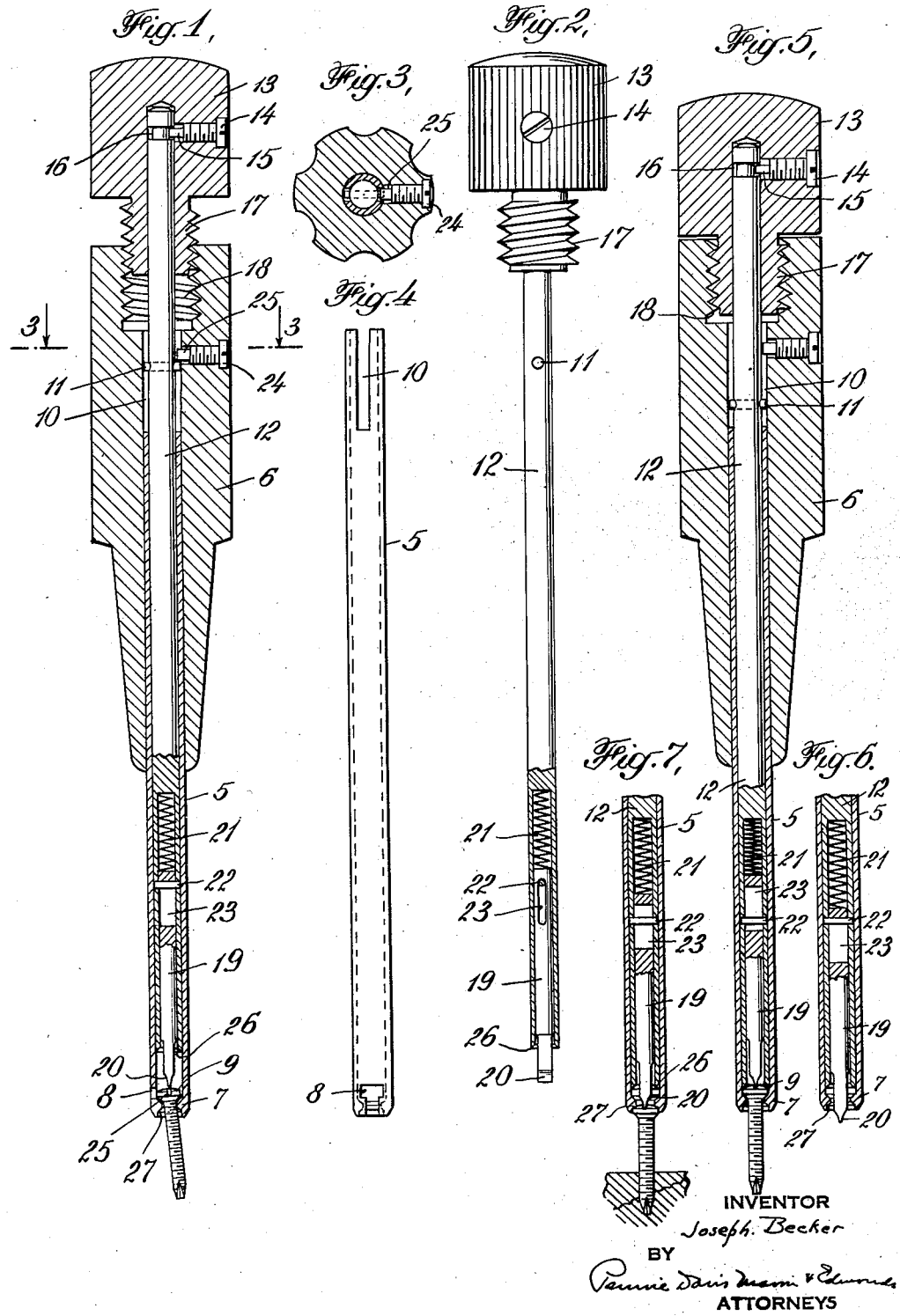
INVENTOR
Joseph Becker
BY
Pennie Davis Marvin & Edmonds
ATTORNEYS Patented July 8, 1941

2,248,054

UNITED STATES PATENT OFFICE 2,248,054

SCREW DRIVER

Joseph Becker, Grantwood, N. J.

Application June 7, 1939, Serial No. 277,801

3 Claims. (Cl. 145—52)

This invention relates to screw drivers, and particularly to an instrument designed to facilitate the handling of screws which are employed in setting bones which have been broken. While the device is particularly adapted for use as a surgical instrument, it may be utilized, in less expensive modifications, for handling wood and machine screws.

The technique of utilizing screws in setting bones is highly developed. It is particularly desirable, in handling screws under the difficult conditions of surgical operations, that the screw be held securely in such a manner that it may be properly located and driven in the intended direction. Ordinary screw drivers are not adapted for the purpose, and instruments heretofore devised have not afforded the desired precision to permit satisfactory handling of the screws.

It is the object of the present invention to provide a simple and efficient instrument whereby screws may be driven in bone structure without danger of slipping or misdirecting the screw, the instrument being designed so that it may be thoroughly sterilized after each use.

Another object of the invention is the provision of a screw driver in which the screw may be gripped firmly, before driving is commenced, and which may be utilized to drive the screw home without danger of slipping from the screw head.

Other objects and advantages of the invention will be apparent as it is better understood by reference to the following specification and the accompanying drawing, in which—

Fig. 1 is a longitudinal section through a screw driver embodying the invention;

Fig. 2 is an elevation partially in section of the spindle withdrawn from the shank and handle of the screw driver;

Fig. 3 is a section on the line 3—3 of Fig. 1;

Fig. 4 is an elevation of the shank of the screw driver separated from the handle;

Fig. 5 is a view similar to Fig. 1, illustrating another working position of the instrument;

Fig. 6 is a sectional view of a portion of the screw driver showing another working position; and Fig. 7 is a view similar to Fig. 6 illustrating another working position.

In carrying out the invention, I provide a hollow shank 5 which is sweated or otherwise secured to a handle 6. The lower or outer end of the shank 5 is provided rigid, or immovable with respect thereto. The claw has a claw 7 with a lateral opening 8 through which the head 9 of the screw may be inserted and in which the screw is loosely held, as indicated in Fig. 1, until the device is manipulated as hereinafter described. The shank 5 is provided at its upper or inner end with slots 10 adapted to receive lugs 11 on the spindle 12 which extends through the shank and is held against rotation by engagement of the lugs 11 with the slots 10.

A head 13, preferably knurled or otherwise provided with a roughened surface as indicated in Fig. 2, is supported on the inner end of the spindle 12 by means of a screw 14 having a projection 15 which engages a groove 16 near the end of the spindle. Thus the head 13 may be rotated without turning the spindle. The head 13 is provided with a threaded extension 17 engaging similar threads in a recess 18 in the inner end of the handle 6. By turning the head 13, the spindle 12 may be advanced or retracted within the shank 5.

The lower or outer end of the spindle 12 is bored or recessed to receive the driver 19, having a blade 20. A spring 21 is disposed behind the driver to longitudinally bias it normally to an advanced position. Movement of the driver is limited by a pin 22 in the spindle which extends through a slot 23 in the driver. The pin 22 also maintains the driver non-rotatable within the bore of the spindle.

A screw 24 is disposed in the handle 6 with the end 25 extending into one of the slots 10 and engaging the lug 11, thus preventing withdrawal of the spindle from the shank. When the instrument is to be sterilized, the screw 24 is loosened, whereupon the spindle may be withdrawn and the entire instrument may be subjected to any suitable sterilizing operation.

In using the instrument, the screw is inserted in the claw after the spindle has been retracted by turning the head 13. The head 13 is then turned to advance the spindle until the blade 20 engages the head of the screw. The spindle is advanced until the cupped end 26 thereof engages the head of the screw, as shown in Fig. 5, whereupon the screw is firmly held with its axis aligned with the axis of the screw driver. The blade will automatically enter the slot 25 in the screw head when the driving operation commences. Thereupon the driving operation may be commenced and continued until the screw is firmly set in position.

When the head of the screw approaches the surface upon which it is to seat, the spindle 12 is again retracted by turning the head 13, and the head of the screw is disengaged from the claw. The spindle is then advanced until the blade 20 projects from the end of the shank as shown in Fig. 6. The blade is engaged with the slot 25 in the screw and pressure is applied until the cupped end 27 of the shank engages the screw head as shown in Fig. 7. Thereafter the screw may be advanced by turning the screw driver without danger of slipping from the screw, the head of which is firmly engaged by the end of the shank 5 and by the blade 20. The screw is seated, and the operation may be repeated with other screws.

As will be understood from the foregoing description, the blade 20 of the driver is held constantly in engagement with the slot of the screw by the resilient pressure of the spring 21. The head of the screw during the initial driving operation is firmly gripped in the claw by the end 26 of the spindle 12. In the subsequent operation, when the screw is seated, the blade 20 is similarly held in the slot by resilient pressure, and the screw driver is prevented from slipping by engagement of the end of the shank 5 with the head of the screw. The structure as described is simple and efficient. It permits the placing and driving of screws under the most difficult conditions of surgical operations, permitting the surgeon to control and direct the screw precisely. The screw cannot slip or wobble or get out of line, and consequently operation is completed quickly and with assurance that the screw is properly placed.

While the screw driver as described is particularly adapted for surgical use, it has obviously many applications in handling wood and machine screws. For such work, the structure may be simplified, and consequently less expensive. For surgical use, the device is constructed preferably of stainless steel and aluminum, but other and less costly materials may be employed where the necessity for sterilization of the instrument is not present.

Various changes may be made in the structure and details of operation without departing from the invention or sacrificing any of the advantages thereof.

I claim:

1. A screw driver comprising a shank and handle, the shank being provided with a claw at one end to receive the head of a screw, said claw being immovable with respect to the shank, a spindle longitudinally movable in the shank and having an outer end adapted to engage the head of a screw seated on said claw, means for causing said outer end of the spindle to hold a screw firmly on said claw after the outer end of the spindle engages the head thereof, said spindle having a longitudinal bore in its outer end, a driver having a blade resiliently biased and longitudinally movable in said bore, and means for maintaining said blade non-rotatably in said bore after the outer end of the spindle engages the head of a screw seated on said claw.

2. A screw driver comprising a shank and handle, said shank being provided with a claw at one end to receive the head of a screw, said claw being immovable with respect to the shank, a spindle longitudinally movable in the shank and having an outer end adapted to engage the head of a screw seated on the claw, means for causing said outer end of the spindle to hold a screw firmly on said claw after the outer end of the spindle engages the head thereof, said spindle having a longitudinal bore in said outer end, a driver having a blade resiliently biased and longitudinally movable in said bore, means for maintaining said blade non-rotatably in said bore after the outer end of the spindle engages the head of a screw seated on said claw, and means normally holding the spindle and shank in assembled relation and permitting separation thereof.

3. A screw driver comprising a handle, a shank having one end rigidly secured in said handle in axial alignment therewith, and having a claw at its other end immovable with respect thereto to form a seat for the head of a screw, a spindle longitudinally but non-rotatably movable in said shank and having an outer end adapted to engage the head of a screw seated on said claw, said spindle having an axial bore at its outer end, a blade resiliently biased longitudinally but non-rotatably in said bore, a head receiving the inner end of the spindle, means to retain the spindle rotatably in said head, said handle having a threaded portion at its inner end, and the head having a correspondingly threaded portion engaging the threaded portion of the handle, whereby rotation of the head in one direction with respect to the handle will cause said spindle to move longitudinally outwardly in said shank and will cause the outer end of the spindle to engage and firmly hold a screw, the head of which is seated on said claw.

JOSEPH BECKER.